INVENTORS:-
HENRY GEORGE WEBSTER &
LEWIS HENRY DAWTREY

United States Patent Office 3,537,257
Patented Nov. 3, 1970

3,537,257
INTERNAL COMBUSTION PISTON ENGINE WITH CONTROLLED AIR INJECTION INTO BOTH EXHAUST DUCT AND CYLINDER
Henry George Webster and Lewis Henry Dawtrey, Coventry, England, assignors to The Standard-Triumph Motor Company Limited, Canley, Coventry, England
Filed Oct. 21, 1968, Ser. No. 769,100
Claims priority, application Great Britain, Dec. 22, 1967, 58,383/67
Int. Cl. F02b 75/10; F01n 3/10
U.S. Cl. 60—30    4 Claims

ABSTRACT OF THE DISCLOSURE

Means for adding air to the products of combustion of a cylinder of an internal combustion piston engine within a period starting after the initiation of combustion of the combustible charge in one engine cycle and ending before termination of the induction of the combustible charge of the next cycle.

---

Figure 1:
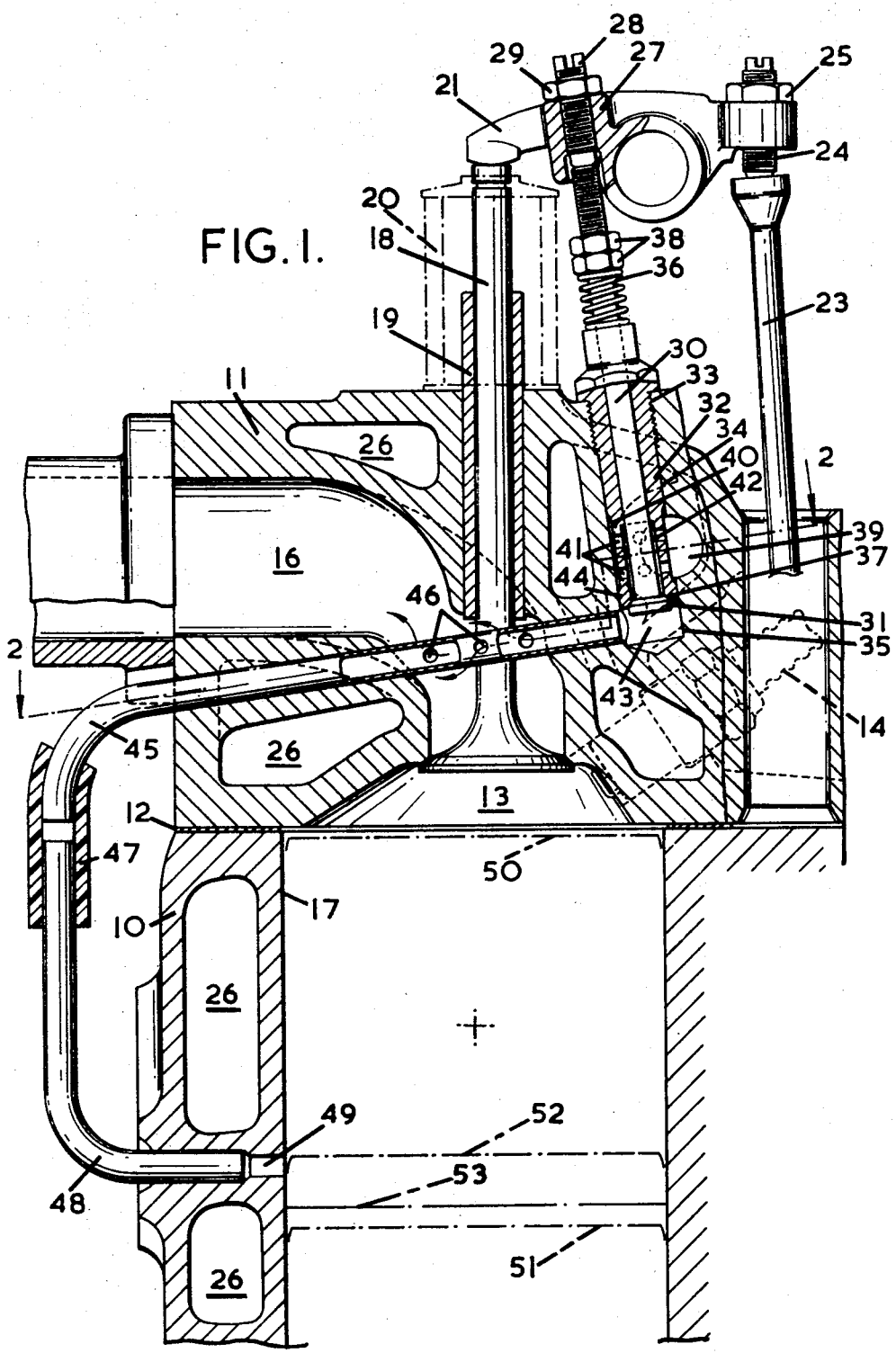

This invention relates to means for adding air to the products of combustion of an internal combustion piston engine.

In order to reduce the quantity of obnoxious constituents in the products of combustion of an internal combustion piston engine, it is known to pump a stream of air into an exhaust passage, such as an exhaust port, exhaust manifold or exhaust pipe of the engine. The air mixes with the hot gaseous products of combustion and further oxidises any constituents which are incompletely oxidised and which form a large part of the obnoxious constituents. Often the air is added as a continuous stream so that during the period that a cylinder is not being exhausted of its products of combustion some of the air is wasted. Furthermore the excess air tends to cool the exhaust passage so that the oxidation of the obnoxious constituents occurs slowly and incompletely.

An object of this invention is to reduce these disadvantages.

According to the invention, means for adding air to the products of combustion within a cylinder of an internal combustion piston engine for further oxidation of the products of combustion includes a source of pressurised air, a duct along which the pressurised air is to pass, and control means arranged for adding the air to the products of combustion for a period starting after the initiation of combustion of the combustible charge in one engine cycle and ending before termination of the induction of the combustible charge of the next cycle, whereby less air will be used and parts of the engine reached by the products of combustion will be hotter than if they were cooled by the excess air so that the further oxidation will be enhanced. Preferably the air is added substantially only when the products of combustion are being exhausted from the cylinder in which the piston acts.

According to a feature of the invention, air may be added into an exhaust passage arranged for discharging the products of combustion from the cylinder. Preferably the air is added at a point in the exhaust passage close to the cylinder.

According to yet another feature, the cylinder end of the passage for adding the air may be positioned such that sealing means of the piston will seal the said end of the passage from the cylinder at a predetermined point of the exhaust stroke of the piston, whereby to inhibit the addition of further air at least until the piston sealing means uncovers the said end of the passage during the next piston stroke.

According to a further feature, the means for adding air may include valve means for controlling the flow of air which is to be added, and the valve means is arranged to be open for a period which is in fixed relationship to the opening of means for allowing the products of combustion to be exhausted from the cylinder. Preferably the valve means is arranged to be open substantially for the whole time that the means is open for allowing the products of combustion to be exhausted from the cylinder. Furthermore, preferably the valve means includes a poppet valve slidably supported in a valve body which is formed with a seating for the poppet valve.

According to another feature, the valve body may be removably fastened into a bore in part of the engine, whereby the operation of the poppet valve may be checked before it is installed in the engine.

According to yet another feature, and in the case where the engine includes a poppet exhaust valve for allowing the products of combustion to be exhausted from the cylinder, the valve means may be arranged to be operated by part of means for operating the exhaust valve.

According to a further feature the means for adding air may include an engine driven cam arranged for operating the valve means.

According to another feature, and in the case where the exhaust valve is operated by a rocker, the means for adding air may include means for operating the valve means from the rocker.

According to yet another feature, the valve means may be arranged to pass air to the exhaust passage and to the passage through the cylinder wall, whereby the air will be added into the exhaust passage for the whole time that the valve means is open, but the addition of air to the products of combustion in the cylinder will be terminated before the valve means closes when the sealing means of the piston seals the end of the passage into the cylinder. Preferably the valve means is arranged to open before the piston reaches bottom dead centre at the end of its working stroke, and to close after the piston reaches top dead centre at the end of its exhaust stroke, and the passage through the cylinder wall becomes covered when the piston has reached a position approximately ninety degrees of crankshaft rotation after bottom dead centre during the exhaust stroke.

The invention is described with reference to the accompanying drawings, by way of example only, as applied to a four-stroke engine having a push-rod operated exhaust valve.

Figure 2:
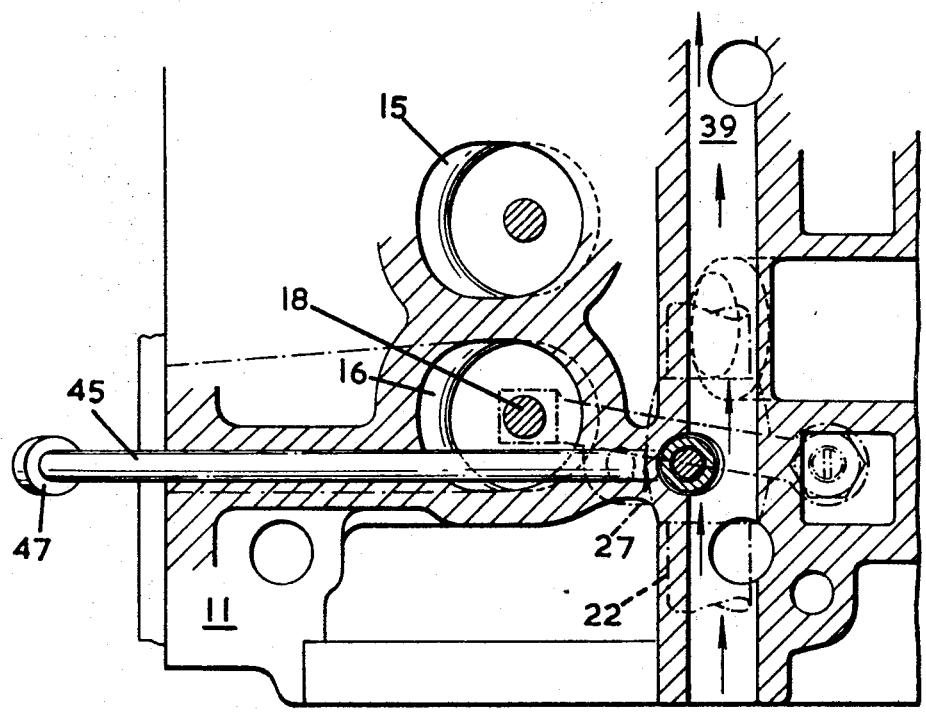

In the drawings:
FIG. 1 is a section in a vertical plane through part of the engine, and
FIG. 2 is a section along the line 2—2 in FIG. 1.

A cylinder block 10 has a cylinder head 11 fastened by unshown studs and sealed by a gasket 12. The cylinder head 11 has a combustion chamber 13, a sparking plug 14, an inlet passage 15, and an exhaust passage 16. The latter is put into communication with the combustion chamber 13 and a cylinder 17 by an exhaust poppet valve 18, slidably supported in the cylinder head 11 by a valve guide 19, closed by a valve spring 20 and opened by a rocker 21 pivoted on a tube 22. The rocker 21 is operated by an unseen cam through a push-rod 23, and clearance is set by a ball-ended screw 24 and lock nut 25. The cylinder block 10 and cylinder head 11 are cooled by water in passages 26.

A boss 37 formed on the side of the rocker 21 intermediate the pivot tube 22 and the exhaust valve 18, has threaded bore in which an adjusting screw 28 is locked by a lock nut 29. The screw 28 operates on a threaded end of an air admission valve 30 of which the other end is formed as the head 31 of a small poppet valve. The air valve 30 is slidably supported in a concentric tubular admission valve body 32 of which the outer surface has a screwed portion 33 holding the valve body 32 into the cylinder head 11, and a plain cylindrical portion 34 which fits into a reamed bore 35 in the cylinder head 11.

The air valve head 31 is urged by a spring 36 to seal against a conical seating face 37, formed at the lower end of the valve body 32. The spring 36 acts between the upper end of the valve body 32 and a pair of lock nuts 38 on the threaded end of the air valve 30, whereby the compression in the spring may be adjusted. The travel of the air valve 30 is conveniently between one third and one half of the travel of the exhaust valve 18. Slight differences in timing between the operation of the air valve 30 and the exhaust valve 18 may be achieved by choice of clearance between the screw 28 and the air valve 30.

Air is supplied by an unshown pump of suitable well known kind at a pressure which may be conveniently 10–15 pounds per square inch above atmospheric. The air passes along a duct 39 which may be cored in the casting so that it may be crooked or of non-circular cross section to avoid obstacles such as coolant or stud passages.

Pressurised air passes from the duct 39 around an annular groove 40 on the outside of the valve body 32 and in through radial bores 41 to an axial bore 42 leading to the air valve head 31. When the air valve 30 is opened by the rocker 21, the pressurised air flows into a chamber 43 below the valve body 32. The chamber 43 is sealed from the annular groove 40 by a land 44. By this form of construction, the air valve 30 may be assembled in its body 32 and its operation checked before the body 32 is screwed into the cylinder head 11.

A heat resistant pipe 45, for example of steel, is fastened in suitable manner such as by brazing or by being a press fit in a bore in the cylinder head. The pipe 45 is positioned so that one open end is in communication with the chamber 43 and the other open end is outside the cylinder head 11. The pipe 45 also passes across the exhaust passage 16, just missing the stem of the exhaust valve 18. Holes 46 in the wall of the pipe 45 connect the interior of the pipe 45 to the exhaust passage 16. Preferably, the area of the maximum valve opening is greater than the area of the pipe cross-section.

The pipe 45 is connected at its outer end by a disconnectible sealing coupling means, such as a plastic tube 47, to one end of a further pipe 48 whose other end is fastened, in the above manner, into a bore 49 extending through the cylinder block 10 and into the cylinder 17.

The position of the crown of a piston is shown at top dead centre by line 50, at bottom dead centre by line 51 and at an intermediate position by line 52. The bottom of the piston skirt at top dead centre is shown by line 53 and serves to prevent oil from fouling the bore 49, and air from entering the crankcase.

In normal operation of the engine as the piston is descending during the expansion stroke, the exhaust valve 18 opens before bottom dead centre. At this time, or a short while before or after depending on clearance setting mentioned above, the air valve 30 will be opened and pressurised air will flow through the air valve 30, the chamber 43, the pipe 45 and the holes 46 to mix with the exhaust gases from the cylinder 17 as they pass the pipe 45 in the exhaust passage 16. To avoid the danger that the initial high pulse of pressure in the exhaust gas, as the valve 18 opens, will blow back through the air valve 30, the latter may be opened a little later than the exhaust valve 18.

The pressure in the cylinder 17 falls rapidly as the exhaust valve 18 opens, but due to the restriction of the exhaust valve 18, will be higher at each instant than in the exhaust passage 16. To avoid pressurised products of combustion in the cylinder from blowing back through pipes 48, 45 and through the air valve 30 after the latter has opened, the height of the opening of the bore 49 into the cylinder 17 may be arranged such that the descending piston covers the bore 49 until the pressure in the cylinder 17 is sufficiently reduced, when the piston crown will uncover the bore 49 as illustrated by line 52. In some engines the component which determines the time of connection of the bore 49 with the cylinder 17 will be the unshown top piston ring rather than the piston crown.

When the air valve 30 is open and the bore 49 is uncovered, pressurised air will flow into the cylinder 17 and will serve to blow the products of combustion upwards out of the cylinder whilst mixing with them so that the further oxidation process will occur in the heat of the cylinder and during the whole of the exhaust stroke, so that a high degree of oxidation will be achieved.

The exhaust valve 18 opens typically at about 60° of crankshaft angle before bottom dead centre and closes after the piston has reached top dead centre. During the whole of that time air will be added to the products of combustion through the holes 46. If, in a particular engine, there is no problem of products of combustion blowing back from the cylinder 17 through the air valve 30, the piston or piston ring may be arranged to uncover the bore 49 at around 90° before bottom dead centre so that pressurised air will enter the cylinder 17 through the bore 49 from about 60° before bottom dead centre, when the exhaust valve 18 and air valve 30 open, to about 90° after bottom dead centre, when the rising piston or piston ring will cover the bore 49. When flow of air through the bore 49 ceases the pressure in the pipe 45 will rise so that extra air will flow through the holes 46, ensuring an adequate supply of air for the later part of the exhaust stroke.

If the air pump delivers air continuously, and since the addition of air to the products of combustion from open cylinder is discontinuous, it may be necessary to feed an air reservoir from the pump outlet to smooth out the pressure variations, particularly if the engine has four cylinders or less.

By adding air to the products of combustion only for substantially as long as the exhaust valve 18 is open, less air is used than if it is injected into the exhaust passage 16 continuously. Furthermore the exhaust system is not cooled unnecessarily by this excess air so that, being hotter, the oxidation process of the products of combustion will be more effective.

Although the invention has been described as adding air into both the cylinder 17 and the exhaust passage 16, it could be applied to the addition of air to either the cylinder 17 only or to both of them through separate pipes.

For some designs of engine, particularly an overhead camshaft type, where there is no rocker 21 it may be convenient to operate the air valve 30 by extra, low lift cams on the camshaft, or by a separate camshaft.

What we claim as our invention and desire to secure by Letters Patent of the United States is:

1. Means for adding air to the products of combustion of an internal combustion engine comprising:
   a cylinder;
   an exhaust outlet and outlet passage for the products of combustion;
   an exhaust outlet valve for controlling the flow through said outlet;
   operating means for the outlet valve;
   a source of pressurised air; and
   a duct, along which the pressurised air is to pass, communicating with said source of pressurised air and both with said outlet passage and with the interior of said cylinder through a wall of the cylinder;
   air control means for opening said duct, said air control means including:
      an air inlet valve and operating means for said valve;
      the operating means for said air inlet valve and the operating means for said outlet valve having common parts and said air inlet valve controlling the flow of air to both locations, whereby the air inlet valve is opened in accordance with the opening of the exhaust outlet valve.

2. Means according to claim 1 wherein the operating means of the outlet valve includes a rocker arm and the air inlet valve is a poppet valve which is operated by said rocker arm.

3. Means according to claim 2 wherein the poppet valve is slidably supported in a valve body which is formed with a sealing for the poppet valve, and the valve body is removably fastened into a bore in part of the engine whereby the operation of the poppet valve may be checked before it is installed in the engine.

4. Means according to claim 1 in which the cylinder end of the duct is positioned such that sealing means of the piston will seal the said end of the duct from the cylinder at a predetermined point of the exhaust stroke of the piston, whereby to terminate the addition of further air into the cylinder before the air inlet valve closes at least until the piston sealing means uncovers the said end of the passage during the next piston stroke, air being supplied to said end of the duct for the whole time that the air inlet valve is open.

References Cited

UNITED STATES PATENTS

| | | | |
|---|---|---|---|
| 2,052,279 | 8/1936 | Colwell | 60—30 |
| 2,263,318 | 11/1941 | Tifft | 60—30 |
| 2,991,766 | 7/1961 | Candelise | 123—26 |
| 3,147,588 | 9/1964 | Tauschek | 60—30 |
| 3,359,721 | 12/1967 | McIlroy | 60—30 |
| 3,364,677 | 1/1968 | Ernst | 60—30 |

DOUGLAS HART, Primary Examiner

U.S. Cl. X.R.

123—26